(12) United States Patent
Nakatsuka et al.

(10) Patent No.: US 9,805,868 B2
(45) Date of Patent: Oct. 31, 2017

(54) BIAXIALLY STRETCHED POLYPROPYLENE FILM FOR CAPACITORS, METALLIZED FILM, AND FILM CAPACITOR

(71) Applicant: Toray Industries, Inc., Tokyo (JP)

(72) Inventors: Takanori Nakatsuka, Tsuchiura (JP); Tetsuya Asano, Tsuchiura (JP); Masami Sugata, Tsuchiura (JP)

(73) Assignee: Toray Industries, Inc. (JP)

( * ) Notice: Subject to any disclaimer, the term of this patent is extended or adjusted under 35 U.S.C. 154(b) by 212 days.

(21) Appl. No.: 14/387,119

(22) PCT Filed: Mar. 15, 2013

(86) PCT No.: PCT/JP2013/057465
§ 371 (c)(1),
(2) Date: Sep. 22, 2014

(87) PCT Pub. No.: WO2013/146367
PCT Pub. Date: Oct. 3, 2013

(65) Prior Publication Data
US 2015/0050456 A1    Feb. 19, 2015

(30) Foreign Application Priority Data

Mar. 28, 2012 (JP) .................................. 2012-073341

(51) Int. Cl.
| | | |
|---|---|---|
| *H01G 4/18* | (2006.01) | |
| *C08J 5/18* | (2006.01) | |
| *H01G 4/015* | (2006.01) | |
| *B29C 55/14* | (2006.01) | |
| *B29K 23/00* | (2006.01) | |

(52) U.S. Cl.
CPC .............. *H01G 4/18* (2013.01); *B29C 55/143* (2013.01); *C08J 5/18* (2013.01); *H01G 4/015* (2013.01); *B29K 2023/10* (2013.01); *B29K 2995/0006* (2013.01); *C08J 2323/10* (2013.01); *Y10T 428/24355* (2015.01)

(58) Field of Classification Search
CPC ... H01G 4/18; Y10T 428/24355; C08L 23/10; C08L 23/12; C08L 23/14; C08L 23/16; B32B 27/32; B32B 2323/10; B32B 2457/16; B32B 2307/538; C08J 5/18
USPC ........................................................ 428/141
See application file for complete search history.

(56) References Cited

U.S. PATENT DOCUMENTS

| | | | | |
|---|---|---|---|---|
| 5,132,157 | A * | 7/1992 | Asanuma .................... | C08J 5/18 428/141 |
| 6,094,337 | A * | 7/2000 | Ueda .......................... | C08J 5/18 361/311 |
| 9,093,219 | B2 * | 7/2015 | Sugata ...................... | H01G 4/18 |
| 2006/0171100 | A1 * | 8/2006 | Uematsu .................... | C08J 5/18 361/323 |
| 2009/0136714 | A1 * | 5/2009 | Itou .......................... | C08J 5/18 428/152 |
| 2013/0170096 | A1 * | 7/2013 | Sugata ...................... | H01G 4/18 428/141 |
| 2014/0268493 | A1 | 9/2014 | Nakatsuka et al. | |

FOREIGN PATENT DOCUMENTS

| | | | | |
|---|---|---|---|---|
| JP | 51-63500 | 6/1976 | | |
| JP | 52-124158 | 10/1977 | | |
| JP | EP 0008623 A1 * | 3/1980 | ............. | B32B 27/32 |
| JP | 62-121704 | 6/1987 | | |
| JP | 2869606 | 3/1999 | | |
| JP | 2001-324607 | 11/2001 | | |
| JP | 2002154187 A * | 5/2002 | | |
| JP | 2003257777 A * | 9/2003 | | |
| JP | 2007-308604 | 11/2007 | | |
| JP | 2007290380 A * | 11/2007 | ............... | H01G 4/18 |
| JP | 2008-133446 | 6/2008 | | |
| JP | 2009-542872 | 12/2009 | | |
| JP | 2011-122142 | 6/2011 | | |
| JP | 2011-122143 | 6/2011 | | |
| WO | WO 2012002123 A1 * | 1/2012 | ............... | H01G 4/18 |

OTHER PUBLICATIONS

Machine translation of EP 0008623 A1. Translated Feb. 6, 2017.*
Machine translation of JP 2011-122142 A. Translated Jun. 6, 2016.*
Machine translation (J-PlatPat) of JP 2002-154187 A. Translated Jun. 7, 2016.*
Machine translation (Espacenet) of JP 2007-290380 A. Translated Jun. 15, 2017.*
Hujiyama, M. et al., "Study on Rough-Surface Biaxially Oriented Polypropylene Film. II. Influence of Stretching Conditions," *Journal of Applied Polymer Sciences*, 1988, vol. 36, pp. 995-1001.
Supplementary European Search Report dated Sep. 23, 2015, of corresponding European Application No. 13769435.2.
Anonymous, "Surface Roughness—Excerpt from JIS B 0601 (1194) and JIS B 0031 (1994)," XP055213913, URL: http://in.misumi-ec.com/pdf/tech/mold/09_mol517.pdf, Sep. 15, 2015, retrieved from Internet.

* cited by examiner

*Primary Examiner* — Maria Veronica Ewald
*Assistant Examiner* — Ethan A Utt
(74) *Attorney, Agent, or Firm* — DLA Piper LLP (US)

(57) ABSTRACT

A biaxially stretched polypropylene film for capacitors which has protrusions on both sides and has a thickness (t1[μm]) of 1 μm to 3 μm, wherein Formulae (1) to (4) are satisfied by an A-side as one film surface and a B-side as another film surface:

| | |
|---|---|
| $\|Pa-Pb\| \geq 200$; | (1) |
| $0.350 \leq Pa/SRzA \leq 0.700$; | (2) |
| $500 \text{ nm} \leq SRzA \leq 1{,}200 \text{ nm}$; | (3) |
| $50 \text{ nm} \leq SRzB \leq 500 \text{ nm}$; | (4) | wherein, in Formulae (1) to (4), Pa is a number per 0.1 mm² of protrusions on the A-side, Pb is a number per 0.1 mm² of protrusions on the B-side, SRzA is a ten-point average roughness of the A-side, and SRzB is a ten-point average roughness of the B-side.

10 Claims, No Drawings

BIAXIALLY STRETCHED POLYPROPYLENE FILM FOR CAPACITORS, METALLIZED FILM, AND FILM CAPACITOR

TECHNICAL FIELD

This disclosure relates to a biaxially stretched polypropylene film suitable for packaging or industrial uses, and relates to a biaxially stretched polypropylene film having a high withstanding voltage and a desirable element processability suitable for capacitor dielectrics, as well as a metallized film and film capacitor to be made from the biaxially stretched polypropylene film.

BACKGROUND

A biaxially stretched polypropylene film is used for various uses such as packaging use, taping use and electrical use of cable wrapping or capacitor production, because of its excellent transparency, mechanical properties and electric characteristics.

As to capacitor production, biaxially stretched polypropylene films having excellent withstanding voltage characteristics and low loss characteristics are desirably used to make a high voltage capacitor for direct current and alternate current.

Recently, electric equipment has been controlled with inverters so that a downsized capacitor having a high capacitance has been further required. Under such a requirement, specifically in the automobile market including the hybrid car market, the biaxially stretched polypropylene film has been required to be thinner together with improving withstanding voltage, security (self-healing ability) and element processability.

From viewpoints of withstanding voltage, security and element processability, the biaxially stretched polypropylene film has to have a proper rough surface. That is important specifically to improve film slipping and oil impregnation, as well as security of deposition capacitor. The security of a metal deposition capacitor having a metal deposition membrane as electrode formed on the dielectric film is a helpful function even from a viewpoint of safety to recover insulation by deposited metal scattering with electric discharge energy under abnormal discharging so that short circuiting is prevented to maintain capacitor functions.

To make such a rough surface, they have suggested a mechanical method such as embossing method and sand blasting method, a chemical method such as chemical etching with a solvent, a method of stretching a sheet made of blended polymers of polyethylene or the like, and a method of stretching a sheet containing β crystals, as disclosed in JP-S51-63500-A and JP 2001-324607-A.

However, the mechanical and chemical methods might decrease the roughness density while the method of stretching a sheet containing β crystals might generate coarse protrusions. Thus, the above-described conventional methods might not achieve sufficient characteristics such as roughness density, coarse protrusion and the number of protrusions. Further, films having the rough surface made by such a method tend to partially be impregnated with insufficient oil impregnation between film layers in producing a capacitor so that the lifetime of the capacitor is shortened. Furthermore, although the method of stretching a sheet made of blended polymers of polyethylene or the like could produce a capacitor with less air bubbles, the blended polymers might deteriorate recyclability.

Furthermore, the biaxially stretched polypropylene film made by any of the above-described methods might have a problem of reliability and lifetime with insufficient withstanding voltage and security under extremely severe capacitor use condition of electric potential gradient of 400V/μm or higher. The electric potential gradient is defined as an applied voltage per unit film thickness, to be calculated by dividing a voltage applied to a dielectric film by the film thickness.

To improve the uniformity of protrusions and roughness density, JP 2011-122143-A, WO 2012/002123 and JP 2011-122142-A suggest films to which high melt tension polypropylene is added. JP 2011-122143-A and WO 2012/002123 disclose effects in the uniformity of protrusions and roughness density, but fail to precisely control protrusion height on both film sides. Thus the requirements of high withstanding voltage, security and element processability for the automobile use could not be satisfied sufficiently.

JP 2011-122142-A discloses a biaxially stretched polypropylene film and producing method thereof having a desirably controlled roughness on both film. However, the technique disclosed in JP 2011-122142-A could hardly be applied to thin films and fails to achieve a sufficiently high withstanding voltage because the technique targets comparatively thick films. Further, it is difficult for the technique to make both film sides microscopically rough and to control protrusion height on both film sides.

JP 2007-308604-A and JP 2008-133446-A disclose methods of forming a microscopic rough surface by designing β crystal fraction of a cast stock sheet within a predetermined range to balance the element winding property with withstanding voltage, under a prescribed roughness on at least one film side. However, such a method could not control the surface roughness on both film sides and the obtained microscopically rough film surfaces could not satisfy the high withstanding voltage, security and element processability required for the automobile use.

It could therefore be helpful to provide a biaxially stretched polypropylene film, metallized film and film capacitor, capable of achieving excellent withstanding voltage, security and reliability as securing stable element processability.

SUMMARY

We thus provide:

(1) A biaxially stretched polypropylene film for capacitors which has protrusions on both sides and has a thickness (t1 [μm]) of 1 μm to 3 μm, wherein Formulae (1) to (4) are satisfied by an A-side as one film surface and a B-side as another film surface:

$$|Pa-Pb| \geq 200; \quad (1)$$

$$0.350 \leq Pa/SRzA \leq 0.700; \quad (2)$$

$$500 \text{ nm} \leq SRzA \leq 1{,}200 \text{ nm}; \quad (3)$$

$$50 \text{ nm} \leq SRzB \leq 500 \text{ nm}. \quad (4)$$

In Formulae (1) to (4), the Pa implies a number per 0.1 $mm^2$ of protrusions on the A-side while the Pb implies a number per 0.1 $mm^2$ of protrusions on the B-side. The SRzA implies a ten-point average roughness of the A-side while the SRzB implies a ten-point average roughness of the B-side.

(2) The biaxially stretched polypropylene film for capacitors according to (1), wherein a centerline average roughness (SRaA) of the A-side is 25 nm to 45 nm.

(3) The biaxially stretched polypropylene film for capacitors according to (1) or (2), wherein a centerline average roughness (SRaB) of the B-side is 10 nm to 25 nm.

(4) A metallized film, wherein a metal film is provided on at least one side of the biaxially stretched polypropylene film for capacitors according to (1) to (3).

(5) The metallized film according to (4), wherein the metal film has a surface electric resistance of 1 to 20Ω/□.

(6) A film capacitor comprising the metallized film according to (4) or (5).

We provide a biaxially stretched polypropylene film for capacitors such as automotive capacitors, wherein excellent surface characteristics, even in thin film, achieve an excellent processability as well as a high withstanding voltage even in a broad atmospheric temperature condition from −40° C. (low temperature) to 115° C. (high temperature).

DETAILED DESCRIPTION

Hereinafter, details of a biaxially stretched polypropylene film for capacitors, metallized film and film capacitor will be explained.

The biaxially stretched polypropylene film has a thickness t1 of 1 μm to 3 μm with protrusions on both sides. The thickness is determined by the micrometer method described later. The A-side as one film surface and the B-side as the other satisfy following Formulae (1) to (4).

$$|Pa-Pb| \geq 200 \quad (1)$$

$$0.350 \leq Pa/SRzA \leq 0.700 \quad (2)$$

$$500 \text{ nm} \leq SRzA \leq 1{,}200 \text{ nm} \quad (3)$$

$$50 \text{ nm} \leq SRzB \leq 500 \text{ nm} \quad (4)$$

In Formulae (1) to (4), Pa implies the number per 0.1 mm$^2$ of protrusions on the A-side while Pb implies the number per 0.1 mm$^2$ of protrusions on the B-side. SRzA implies a ten-point average roughness of the A-side while SRzB implies a ten-point average roughness of the B-side.

First, thickness t1 will be explained. From viewpoints of capacitor element size and stable film forming, it is preferable that the biaxially stretched polypropylene film has a film thickness (t1) of 1 to 3 μm when determined by the micrometer method. It is preferable that the film thickness determined by the micrometer method is 1.2 to 2.5 μm, preferably 1.5 to 2.3 μm. The film thickness less than 1 μm might deteriorate a mechanical strength, insulation breakdown strength and withstanding voltage. The film thickness more than 3 μm might decrease the content per volume of a dielectric for capacitors and be disadvantageous for reducing in size and weight of capacitors.

The film satisfies following Formulae (1) and (2).

$$|Pa-Pb| \geq 200 \quad (1)$$

$$0.350 \leq Pa/SRzA \leq 0.700 \quad (2)$$

In Formulae (1) and (2), Pa implies the number per 0.1 mm$^2$ of protrusions on the A-side while Pb implies the number per 0.1 mm$^2$ of protrusions on the B-side. SRzA implies a ten-point average roughness of the A-side.

If the |Pa−Pb| is 200 or more, a surface difference can be extended between both sides to maintain an appropriate air layer in a clearance between film layers while a capacitor is produced. Thus, the desirable clearance between film layers is maintained to improve capacitor characteristics, specifically for a use having a great importance to security, self-healing ability (self-recovering process) and reliability.

In Formula (2), the Pa/SRzA of 0.350 to 0.700 could form uniform protrusions having a high density to achieve a good self-healing ability.

As shown in Formula (3), the film has a ten-point average roughness (SRzA) of the A-side of 500 nm to 1,200 nm. If the ten-point average roughness (SRzA) is less than 500 nm, the film might not be rewound well from insufficient removal of air while defects of scratches tend to be generated when the film is delivered in deposition process, slitting process and capacitor element winding process. Particularly in the capacitor element winding process, the film tends to have wrinkles and narrow interlayer clearances so that local adhesion of layers decreases the withstanding voltage from electric field concentration. If the ten-point average roughness is more than 1,200 nm, coarse protrusions tend to deteriorate the insulation breakdown while the minimum film thickness might decrease to deteriorate the withstanding voltage.

As shown in Formula (4), the film has a ten-point average roughness (SRzB) of the B-side of 50 nm or more and less than 500 nm. If the ten-point average roughness (SRzB) is less than 50 nm, the film might not be rewound well from poor slipping ability while defects of scratches tend to be generated when the film is delivered in deposition process, slitting process and capacitor element winding process. If the ten-point average roughness is 500 nm or more, broad interlayer clearances tend to deteriorate the insulation breakdown while the minimum film thickness might decrease to deteriorate the withstanding voltage.

The SRaA of 25 nm to 45 nm could improve a self-healing ability. The SRaB of 10 nm to 25 nm could improve a withstanding voltage.

Hereinafter, technical backgrounds will be explained. To improve withstanding voltage, security, self-healing ability and element processability of polypropylene film, it is important to control a surface roughness, a protrusion height and the number of the protrusions on both sides of the polypropylene film. To appropriately reduce local adhesion between film layers of elements, residual stress and scattering of deposited metal, it is important to design uniformity of film interlayer clearances, size of the clearance, protrusion density and good slipping ability between films or between a film and a conveying roll. Therefore, we employ indexes other than conventional indexes such as two-dimensional or three-dimensional centerline surface roughness and ten-point average roughness. Namely, the film having an SRzA of 500 nm to 1,200 nm and SRzB of 50 nm to less than 500 nm is designed to have an appropriate range of index concerning the number of protrusions so that a desirable element processability, high withstanding voltage, security and self-healing ability are achieved.

Generally, a smoothed surface designed to thicken the minimum film thickness to enhance the withstanding voltage tends to narrow the film interlayer clearances so that the security and self-healing ability deteriorate from enhanced close contact between deposited metal and film.

We provide an extremely thin film having a film thickness of 1 to 3 μm, in which a ten-point average roughness (SRzA) of the A-side as one film surface is 500 nm to 1,200 nm while a ten-point average roughness (SRzB) of the B-side as the other film surface is 50 nm to less than 500 nm, so that required high withstanding voltage, security and self-healing ability are achieved at the same time.

$$|Pa-Pb| \geq 200 \quad (1)$$

$$0.350 \leq Pa/SRzA \leq 0.700 \quad (2)$$

It is preferable that the biaxially stretched polypropylene film has a centerline average roughness (SRaA) of the A-side of 25 nm to 45 nm. If the SRaA is less than 25 nm, the film might not be rewound well from insufficient removal of air or the like to disarrange the roll shape, so that the slitting process and capacitor element forming process are not performed well. Further, narrowed interlayer clearances might deteriorate the self-healing ability while the film is laminated. On the other hand, the SRaA more than 45 nm might decrease the insulation breakdown voltage, and therefore it is preferable that the SRaA is 25 nm to 45 nm. It is more preferable that the SRaA is 26 nm to 40 nm, preferably 28 nm to 35 nm, so that the film excellent in security, self-healing ability and processability is provided.

It is preferable that the biaxially stretched polypropylene film has a centerline average roughness (SRaB) of the B-side is 10 nm to 25 nm. If the centerline average roughness (SRaB) is more than 25 nm, the film being laminated might contain the air between layers, so that capacitor elements deteriorate. If the SRaB is less than 10 nm, the film might deteriorate in slipping ability and handling ability, and capacitor elements impregnated with insulation oil might greatly fluctuate the volume in a continuous use because the insulation oil doesn't permeate uniformly between film layers. It is preferable that the SRaB is 15 nm to 23 nm, preferably 17 nm to 22 nm, so that the film is excellent in withstanding voltage and processability.

The centerline average roughness (SRaA, SRaB) on one film side designed within the above-described range could provide a film excellent in security improved as having a stable volume even when the film is applied to capacitors to secure a high withstanding voltage and a rewinding property in a forming process of capacitor elements.

Thus obtained biaxially stretched polypropylene film having prescribed surface protrusion height, protrusion density and the number of protrusions is excellent in uniformity of protrusion height on the surface and has different numbers of protrusions between both film sides. Such a biaxially stretched polypropylene film can be used to produce a capacitor having a stable security to maintain a capacitor lifetime for a long term without breakdown from short circuit since the necessary minimum film interlayer clearance for deposited metal to scatter is maintained uniformly to achieve a good self-healing ability even if the insulation is broken down by a high voltage.

The protrusion height, the number of protrusions and parameters such as SRz and SRa can be determined according to JIS B-0601 (1982) with "Noncontact 3D Microfigure Measuring Instrument (ET-30HK)" and "3D Roughness Analyzer (MODEL SPA-11)" made by Kosaka Laboratory Ltd. Details of measurement conditions or the like will be explained later.

Hereinafter, a producing method of the above-described biaxially stretched polypropylene film for capacitors will be explained.

From a viewpoint of low possibility of deteriorating electrical characteristics such as insulation breakdown voltage without adding electrically conductive impurities, crystal modification can typically be utilized to achieve target protrusions and surface roughness.

The crystal modification achieves a surface formation which will be explained as follows. In the crystal modification as disclosed in M. Fujiyama, Journal of Applied Polymer Science 36, p. 985-1048 (1988), a surface may be formed with two kinds of polypropylene spherocrystals based on α crystals (monoclinic system, crystal density 0.936 g/cm$^2$) and β crystals (hexagonal system, crystal density 0.922 g/cm$^2$) which have been generated in an unstretched sheet so that unevenness is formed on a film surface by modifying thermally-unstable β crystal into α crystal in a stretching process. Thus obtained basic unit of unevenness on the surface is derived from the spherocrystal modification and, therefore, the shape may be like a crater such as ellipse and arc made of protrusion group. The surface may be formed by the crystal modification with a lot of the craters made of the ellipse or arc-shaped collective protrusion.

Characteristically, the unevenness may not be formed partially on a comparatively flat surface where no β crystal-based spherocrystal exists. The above-described protrusion group having a crater changes in shape according to the draw ratio of longitudinal/transverse directions in a biaxially stretching process. For example, an isotropic stretching by 1 of longitudinal/transverse draw ratio would make an almost circular shape while the greater longitudinal/transverse draw ratio would make a flattened shape. It is usual that a successive biaxial stretching process makes an ellipse-shaped protrusion group having the major axis along the transverse direction (film roll width direction). The protrusion group may overlap with a plurality of craters having different shapes if the spherocrystal has been prepared by a certain way. Alternatively, the protrusion group may have a shape of arch or semiarc without being closed at both ends.

In this example, it is possible that a nucleation agent is added to enhance nucleation ability so that the surface shape prescribed with Pa and Pb is achieved. The nucleation agent can increase the number of nuclei to provide a lot of microscopic protrusions to obtain a surface formation in which protrusions are uniformly provided as a whole, as leaving less area of flat parts with no protrusion. The obtained surface has protrusions formed close to each other and therefore the prescribed surface shape can be achieved easily.

The nucleation agent may be a branched-chain polypropylene. The crater shape can be controlled by adjusting the amount of added branched-chain polypropylene and the film forming condition so that the characteristic surface shape of the biaxially stretched polypropylene film is achieved.

It is preferable that the biaxially stretched polypropylene film contains 0.05 to 10 mass % of the branched-chain polypropylene. The branched-chain polypropylene means a polypropylene having 5 or less of internally trisubstituted olefin per 10,000 carbon atoms constituting the branched-chain polypropylene. The internally trisubstituted olefin can be detected by determining a proton ratio of 1H-NMR spectrum.

To prepare the branched-chain polypropylene, it is preferable that an oligomer or a polymer having a branched structure is blended, or that a long branched-chain structure is introduced in a polypropylene molecule as disclosed in JP-S62-121704-A. Alternatively, the method disclosed in JP-2869606-B is preferably employed. It is even possible that a short branched-chain structure is introduced as disclosed in JP 2009-542872-A. The branched-chain polypropylene available may be "Profax PF-814" made by Basell Company or "Daploy HMS-PP" made by Borealis Company.

From a viewpoint of film forming property, it is preferable that the branched-chain polypropylene has a melt tension of 1 cN to 30 cN, preferably 2 cN to 20 cN. The greater melt tension tends to improve the uniformity of protrusion height to form a dense surface with greater number of protrusions per unit area. The melt tension less than 1 cN might have a poor uniformity of protrusion height while the melt tension more than 30 cN might not maintain a desirable protrusion height.

If the branched-chain polypropylene of 0.05 to 10 mass % is contained, the size of spherocrystal generated in a cooling process of melt extruded resin sheet can easily be controlled to be small enough to suppress insulation defects generated in a stretching process so that a polypropylene film excellent in withstanding voltage is prepared. The branched-chain polypropylene, which can also function like α crystal nucleation agent, may be added by a predetermined amount to form a rough surface achieved by the crystal modification. Together with the effect of reducing the size of the spherocrystals, crater-shaped protrusion groups can be densely formed to be small enough to provide a biaxially stretched polypropylene film excellent in uniformity of protrusions and has a characteristically excellent surface roughness without coarse protrusions. It is preferable that the branched-chain polypropylene is contained by 0.05 to 3 mass %. The branched-chain polypropylene within such a range can improve rewinding property and withstanding voltage so that a film excellent in element processability and capacitor characteristics is provided.

Further, if the branched-chain polypropylene is added, the melt crystallization temperature of polypropylene can be increased from approximately 110° C. to 115° C. or higher. Namely, such a high melt crystallization temperature makes it easy to recover security in the self-healing process (self-recovering process) to improve the withstanding voltage without insulation breakdown. In other words, if a dielectric film has an insulation breakdown, discharged energy may scatter the deposited metal around to heat the film to partially melt. However the insulation can easily be recovered because the high melt crystallization temperature is advantageous to recrystallize the film. Under a high atmospheric temperature of capacitors, recrystallization is usually prevented to make it difficult to recover the insulation ability. The increased melt crystallization temperature can promote the recrystallization even under a high temperature at the time of insulation breakdown so that the security is improved. Further, the surface roughness may be controlled to enhance the roughness to secure gaps between film layers so that the insulation is recovered further to improve the withstanding voltage.

Next, a linear-chain polypropylene contained in the biaxially stretched polypropylene film will be explained.

It is preferable that the linear-chain polypropylene, which is usually used for packaging materials and capacitors, has a cold xylene soluble part (may be called "CXS") of 4 mass % or less. The cold xylene soluble part (CXS) is a component of polypropylene dissolved in the xylene filtrated to remove insoluble residue precipitated in cooling a sample which has been completely dissolved with hot xylene. The CXS is regarded as representing a component which is hardly crystallized because of low stereoregularity, low molecular weight or the like. Such a component contained in the resin by a great amount might deteriorate thermal dimension stability or an insulation breakdown voltage at a high temperature. Therefore, it is preferable that the CXS is 4 mass % or less, preferably 3 mass % or less, and particularly preferably 2 mass % or less. It is preferable that the above-described range is satisfied by a linear-chain polypropylene, as well as a whole film containing the polymer. It is preferable that the CXS is as little as possible, but more than 1 mass % of the practical lower limit.

To prepare a polymer or a polypropylene film containing the CXS of the above-described proportion, it is possible that the catalytic activity is enhanced when the polymer is prepared or that a polymer is washed with solvent such as n-heptane or its own propylene monomer. It is preferable that the linear-chain polypropylene has a mesopentad fraction of 0.95 or more, preferably 0.97 or more. The mesopentad fraction is an index corresponding to a stereoregularity of polypropylene crystal phase determined by the nuclear magnetic resonance method (NMR method). The higher mesopentad fraction is preferable as representing the higher crystallinity, higher melting point and higher insulation breakdown voltage at a high temperature. The upper limit of the mesopentad fraction is not prescribed particularly. To prepare such a polymer having a high stereoregularity, it is possible that a polymerized resin powder is washed with solvent such as n-heptane. It is preferable that the mesopentad fraction is as high as possible, but less than 0.995 of the practical upper limit.

From a viewpoint of film forming property, it is preferable that the available linear-chain polypropylene has a melt flow rate (MFR) of 1 g/10 min to 10 g/10 min (at 230° C. with 21.18N load), preferably 2 g/10 min to 5 g/10 min (at 230° C. with 21.18N load). To set the melt flow rate (MFR) within the preferable range, the average molecular weight or molecular weight distribution may be controlled.

It is possible that the linear-chain polypropylene is chiefly a propylene homopolymer as well as a polypropylene copolymer containing another unsaturated hydrocarbon as a copolymerizing component, to such an extent as not to damage the purpose of the present invention. Alternatively, the propylene homopolymer may be blended with the propylene copolymer containing another unsaturated hydrocarbon as a copolymerizing component. Such a copolymerizing component or a monomer constituting the blend may be ethylene, propylene (for blended copolymer), 1-butene, 1-pentene, 3-methyl-1-pentene, 3-methyl-1-butene, 1-hexene, 4-methyl-1-pentene, 5-ethyl-1-hexene, 1-octene, 1-decene, 1-dodecene, vinylcyclohexene, styrene, allyl benzene, cyclopentene, norbornene, 5-methyl-2-norbornene or the like. From viewpoints of insulation breakdown resistance and dimensional stability, it is preferable that the copolymerizing component is contained by less than 1 mol % and the copolymer is blended by less than 10 mass %.

The linear-chain polypropylene may contain various additives such as crystalline nucleation agent, antioxidant, thermostabilizer, lubricant, antistatic agent, antiblocking agent, filler, viscosity modifier and coloration inhibitor, to such an extent as not to damage the films.

Above all, it is sometimes important to select the kind and content of the antioxidant to achieve a long term thermostability. It is preferable that the antioxidants are sterically hindered phenol-based antioxidants of which at least one kind has a high molecular weight of 500 or more. For example, it is preferable that 2,6-di-tert-butyl-p-cresol (BHT: molecular weight 220.4) is blended with 1,3,5-trimethyl-2,4,6-tris(3,5-di-tert-butyl-4-hydroxybenzyl)benzene (such as Irganox (registered trademark) 1330 made by Ciba-Geigy Ltd.: molecular weight 775.2) or tetrakis[methylene-3-(3,5-di-tert-butyl-4-hydroxyphenyl]propionate] methane (such as Irganox 1010 made by Ciba-Geigy Ltd.: molecular weight 1,177.7), or the like. It is preferable that the total content of these antioxidants is 0.03 to 1 mass % to the total amount of polypropylene. The antioxidant content less than 0.03 mass % might cause a poor long-term thermostability. The antioxidant content more than 1 mass % might have a bleedout of these antioxidants to cause a blocking at a high temperature so that capacitor elements have a bad effect. It is more preferable that the content is 0.1 to 0.9 mass %, preferably 0.2 to 0.8 mass %.

In this example, the crystalline nucleation agent may be added to such a content as not to damage the films. Although the branched-chain polypropylene has its own crystalline nucleation effect of α crystal or β crystal, it is preferable to add another kind of α crystalline nucleation agent (dibenzylidene sorbitol, sodium benzoate or the like) or β crystalline nucleation agent (1,2-hydroxystearic acid potassium salt, benzoic acid magnesium, amide-based compound such as N,N'-dicyclohexyl-2,6-naphthalene dicarboxamide, quinacridone-based compound or the like), or the like. Such a crystalline nucleation agent added might have bad effects on surface roughness and electric characteristics so that a target surface roughness may be hardly achieved and a specific volume resistivity may decrease at a high temperature. Therefore, it may be preferable that the content of the crystalline nucleation agent is less than 0.1 mass % including substantively zero.

As to a gloss on the surface of the biaxially stretched polypropylene film, because the film has an extremely thin film thickness of 1 to 3 μm and requires a high withstanding voltage, it is preferable that the gloss is 110 to 135%, preferably 120 to 130%. Decreased gloss would lead to an increased light scattering density on the film surface. Namely, if the gloss decreases an unevenness is densified on the film surface caused by the increased number of protrusions per unit area to increase a roughness density. If the gloss is less than 110% so that a liquid impregnation is improved, retained air amount might increase among dense protrusions of increased height and number, so that the element winding property is deteriorated with slippery film layers to prevent the film from being smoothly rewound into a roll while sometimes deteriorating the withstanding voltage. If the gloss is more than 135%, the film might be prevented from slipping between layers to form a flattened capacitor element, and a sufficient film interlayer clearance might not be maintained and therefore the deposited metal or the like might not scatter properly to deteriorate the security and self-healing ability of capacitors. The gloss of 120 to 130% could improve a balance among element rewinding property, withstanding voltage and security. It is more preferably 123 to 127%.

It is preferable that the biaxially stretched polypropylene film has an ash (determined according to JIS-C 2330 (1995) 6.3.5) of 50 ppm or less (on a mass basis, the same hereinafter), preferably 30 ppm or less, and particularly preferably 20 ppm or less. If the ash is excessive, the insulation breakdown resistance of the film might deteriorate to decrease an insulation breakdown strength of capacitors. It is important to use raw materials containing less amount of catalytic residual to design the ash within the above-described range. To minimize even a contamination derived from an extrusion system at a film forming process, it is possible that a bleeding process is performed for 1 hour or more and then flow paths are washed sufficiently with polymer before the film forming process. It is preferable that the ash is as little as possible, but more than 10 ppm of the practical lower limit.

The biaxially stretched polypropylene film is suitable as a dielectric film for capacitors. From a viewpoint of electrode configuration, the capacitor may be a foil winding capacitor or a metal deposition film capacitor. Alternatively, it may be a capacitor impregnated with insulation oil or a dry type capacitor containing no insulation oil. It may be a winding-type or a laminate type of capacitor. From a viewpoint of characteristics of the film, it is preferable that the capacitor is a metal deposition film capacitor.

Generally, a polypropylene film doesn't have a surface energy high enough to perform a metal deposition stably onto it. Therefore, it is preferable that the biaxially stretched polypropylene film is subjected to a surface treatment in advance for the purpose of improving metal adhesion. The surface treatment may be corona discharge processing, plasma processing, glow discharge processing, flame processing or the like. Generally, a polypropylene film has a surface wet tension (determined according to JIS K-6768 (1995)) around 30 mN/m. It is preferable that the film is subjected to the surface treatment to adjust the wet tension within 37 to 50 mN/m, preferably 39 to 48 mN/m so that the adhesion to the metal film and security are improved.

The biaxially stretched polypropylene film is prepared by biaxially stretching raw materials capable of giving the above-described characteristics. The biaxial stretching process may be performed as inflation-type simultaneous biaxial stretching, tenter-type simultaneous biaxial stretching, or tenter-type successive biaxial stretching. From a viewpoint of controlling a film surface shape, it is preferable that the tenter-type successive biaxial stretching process is employed.

Hereinafter, the tenter-type successive biaxial stretching process to produce the biaxially stretched polypropylene film will be explained, for example.

First, a linear-chain polypropylene resin blended with branched-chain polypropylene of a predetermined proportion is melt extruded and filtrated through a filter. Then, it is extruded from a slit-shape die at 220 to 280° C. and solidified on a cooling drum to make an unstretched film.

The extruded film may be closely attached to the cooling drum with electrostatic force or water surface tension or, alternatively by air-knife method, press-roll method or water-cast method. It is preferable that the air-knife method is employed to achieve a good flatness and desirably-controlled surface roughness.

In the air-knife method, protrusions on the film surface may be controlled by adjusting the air temperature for the air-knife as prior arts disclosed in Patent documents 3 and 4. However, it is difficult to prepare a polypropylene film having a desirable protrusion distribution on both film sides achieved in this example only by the air-knife method for controlling the surface roughness by controlling the protrusion distribution to some extent.

To achieve a desirable protrusion height and desirable number of protrusions in the biaxially stretched polypropylene film, it is important that an unstretched sheet is closely attached to a cooling drum with an air-knife at a predetermined temperature as well as the following items <1>-<4>.

<1> A circumferential speed of the cooling drum is controlled.

<2> A temperature retention time is controlled at the drum side and the anti-drum side while a generation rate and size of β crystals on both film sides are controlled.

<3> A preheating temperature, a circumferential speed and nip pressure of the preheating roll, and a nip temperature are controlled before a stretching process.

<4> A nip pressure and a nip temperature are controlled at a stretch part.

The said temperature retention time means a period when the unstretched fiber is in contact with the cooling drum.

The generation rate and protrusion height of the β crystals on the film surface can be controlled by adjusting the temperature retention time on both film sides. For example, the surface being in contact with the cooling drum retains a temperature at which the β crystals tend to be generated so that the size of the crystal decreases while the β crystals are generated at a high rate. On the contrary, the surface being not in contact with the cooling drum doesn't retain a temperature at which the β crystals tend to be generated and, therefore, the protrusion height and fibril size increase while the β crystals are generated at a low generation rate.

JP 2011-122142-A discloses a method of adjusting a heat quantity given to both film sides, in which a contact time of each film side to the roll is controlled in a preheating process before a stretching process. However, only such a control of the contact time to the chill roll and a contact time of each roll in the preheating process is not sufficient to control the number of protrusions because heat conduction is too fast in such an extremely thin film as shown in this example.

If a temperature, a nip pressure and a nip temperature of the preheating roll to contact one film side are adjusted, a film temperature on the one film side can be controlled just before being stretched, so that the surface roughness, protrusion height and the number of protrusions are controlled desirably even in such a thin film as shown in this embodiment. Thus, each surface roughness on both film sides can be controlled independently to form a surface suitable for purposes. At the same time, the nip pressure and nip temperature at the stretch part can be adjusted to enhance accuracy in controlling.

To efficiently generate the β crystals in a cooling process after an extrusion process, it is preferable that the resin temperature is maintained for a predetermined period of time at a temperature capable of generating the β crystals at a maximum efficiency. It is preferable that the cooling drum has a temperature of 70 to 135° C., preferably 80 to 120° C., specifically preferably 85 to 110° C. It is preferable that the temperature retention time is 1.5 sec or more, preferably 2.0 sec or more.

Next, the unstretched film is biaxially stretched to be oriented biaxially. The unstretched film is fed between the preheating rolls to preheat the film. It is preferable that the preheating zone has a temperature of 120 to 140° C. It is preferable that the preheating roll to contact the A-side of the film has a temperature of 130 to 140° C. It is preferable that the preheating zone contacting the A-side has a nip pressure of 0.25 to 0.55 MPa, preferably 0.35 to 0.45 MPa. It is preferable that the preheating zone contacting the A-side has a nip temperature of 100 to 140° C. It is more preferable that the nip temperature is 110 to 130° C.

Thus, the temperature and pressure of the nip contacting the A-side can be adjusted to control protrusions on only the A-side of the film. A bad feeding condition caused by wrinkles or the like derived from a temperature variation at the preheating zone can be fixed by adjusting a circumferential speed between the preheating rolls. It is preferable that the circumferential speed has a speed difference of 0.1 to 3.0% between the front and rear rolls. Such a difference between circumferential speeds could improve a close contact between the film and the roll to easily control the film temperature. To control the film temperature sufficiently, it is preferable that the difference between circumferential speeds is 1.0 to 2.5%, preferably 1.5 to 2.0%.

It is preferable that the longitudinal stretch part has a roll temperature of 130° C. to 160° C. at which β crystals are melted inside the unstretched film to form protrusions on the film surface. It is more preferably 135° C. to 155° C., preferably 140° C. to 150° C. If the roll temperature of the stretch part is more than 160° C., the film might adhere to the roll to break the film. If the roll temperature is less than 130° C., the film might have a stretch unevenness and protrusions might not be formed on the film surface because of unmelted β crystals.

It is preferable that a stretching zone is heated with a radiation heater. Such a heating with the radiation heater could heat the stretching zone without contacting the film surface so that the protrusion formed on the surface is controlled directly and accurately. Therefore, in the biaxially stretched polypropylene film, a protrusion distribution can be formed on both film sides, by controlling a heating without contacting and a uniform heating onto one side with the stretching nip as well as conventional heating of the film with a roll. It is preferable that the A-side is heated with the radiation heater. It is preferable that the radiation heater has an output of 1.5 kW to 13.0 kW so that β crystals are melted to form protrusions on the surface like the conventional heating with rolls. It is more preferably 2.0 kW to 11.0 kW, preferably 2.5 kW to 10.5 kW. The radiation heater having an output of more than 13.0 kW might melt the film and break the film easily. If the radiation heater has an output of less than 1.5 kW, desirable protrusion distribution might not be formed on the film surface because of a film break and smaller protrusions on the surface to be heated with the radiation heater.

In the biaxially stretched polypropylene film, it is preferable that a longitudinal draw ratio is 4.0 to 5.5 so that the β crystals are melted appropriately. It is more preferably 4.3 to 5.2. Because the protrusions on the film surface are stretched, the draw ratio can be adjusted to control the size of protrusions. The longitudinal draw ratio of more than 5.5 might make the film so breakable that the film forming is difficult. If the draw ratio is too low, the size of protrusions on the film surface is too small while the tensile strength is too low. The draw ratio of less than 4.0 might not achieve a desirable protrusion size, so that the withstanding voltage and security are deteriorated.

To stably control protrusion distribution, it is important that the biaxially stretched polypropylene film is quenched right after being stretched in a film longitudinal direction. It is preferable that the film is quenched at 30 to 50° C. right after being stretched in the longitudinal direction. The quenching process at 30 to 50° C. could stop the melting of the β crystals to maintain the height and the number of protrusions formed on the film surface when the film is stretched. If the quenching temperature is more than 50° C., the β crystals might not stop melting and therefore the protrusion distribution formed on the film surface in the stretching process might not be maintained so that the height and the number of protrusions on the film surface are not achieved. If the quenching temperature is less than 30° C., the film might be solidified rapidly to greatly vary the film size to make the film forming unstable. The film may be quenched with a chill roll or an air.

The film is stretched in the longitudinal direction and then the stretched film is stretched with a tenter by a draw ratio of 5 to 15 in the transverse direction at 150 to 170° C., and then is heat-set at 140 to 170° C. as being relaxed by a relaxation rate of 2 to 20% in the transverse direction. After being heat-set, the deposition surface of the stretched film may be subjected to a corona discharge processing in an atmosphere of air, nitrogen, carbon dioxide or a mix gas thereof, to improve the adhesion of the deposition metal, so that a desirable biaxially stretched polypropylene film is provided.

To provide a metal film on the biaxially stretched polypropylene film to make a metallized film, it is preferable that a vaporized aluminium is deposited on at least one side, or both sides if needed, of the biaxially stretched polypropylene film to be provided with a metal film such as aluminium deposition film which is used as an internal electrode of a film capacitor. Simultaneously or successively with aluminium, another vaporized metal such as nickel, copper, gold, silver, chrome and zinc may be deposited onto the film. It is possible that the deposition film is covered with oil to provide a protective layer.

It is preferable that the metal film has a thickness of 20 to 100 nm, from viewpoints of self-healing ability and electrical characteristics of film capacitors. For the same reason, it is preferable that the metal film has a surface electric resistance of 1 to 20Ω/□. The surface electric resistance can be controlled by designing a metal species and film thickness. The measurement method of the surface electric resistance will be explained later.

Thus prepared metallized film can be subjected to an aging process or a heat-setting process at a certain temperature. To give an insulation function or the like, it is possible that at least one side of the metallized film is coated with polyphenylene oxide or the like.

Thus prepared metallized film can be laminated or wound to produce a film capacitor in various ways. A winding-type film capacitor can be produced as follows.

Vapor deposition process: Vaporized aluminium is deposited in vacuum onto a side of the biaxially stretched polypropylene film. A stripe pattern is deposited as leaving margin parts along the film longitudinal direction. Slitting process: Next, the middle of each deposition part and the middle of each margin part on the surface are slit with blades to prepare a rewound tape reel provided with a margin at one side on the surface. Element winding process: With each rewound tape reel having a margin at the left or right sides, each reel having the left or right margin is overlapped to make the deposition part protrude widthwise from the margin part and is wound to make a winding body. A core material is removed from the winding body to be pressed and then a molten metal is sprayed to both end faces to make external electrodes. Lead wires are welded to the metal to produce a winding-type film capacitor. Thus obtained film capacitor is applicable to vehicles, home appliances such as TV and refrigerator, general noise prevention device, automotive device such as hybrid car, power window and wiper, power supply or the like.

The measurement method of characteristic values and evaluation method of effects are as follows.

(1) Film Thickness t1 [μm]

Thickness is measured by the micrometer method according to JIS C-2330 (2001) 7.4.1.1.

(2) Gloss

Gloss is determined as a five-point average measured according to JIS K-7105 (1981) with Digital Variable-angle Gloss Meter UGV-5D made by Suga Test Instruments Co., Ltd. under a condition of incidence angle 60° and receptor angle 60°.

(3) Melt Flow Rate (MFR)

Melt flow rate is measured according to JIS K-7210 (1999) at measurement temperature 230° C. and load 21.18N.

(4) Melt Tension (MS)

Melt tension is measured with an MFR measurement device according to JIS-K7210 (1999). A sample of polypropylene is melted at 230° C. and is extruded at extrusion speed of 15 mm/m to make a strand. With a melt tension tester made by Toyo Seiki Seisaku-sho, Ltd, a melt tension is determined as a tension at which the strand is taken up at speed of 6.5 m/min.

(5) Melt Crystallization Temperature [° C.]

With a differential scanning calorimeter RDC220 made by SEIKO Company, melt crystallization temperature is measured under the following condition.

<Preparation of Samples>

A sample of 5 mg is enclosed in an aluminum pan for measurement. Metal or the like deposited on the film is removed as needed.

<Measurement>

The film is melted and recrystallized by the following steps from (a) to (b). Three sets of measurements of the Tmc peak are performed to calculate an average value to be a melt crystallization temperature.

(a) 1st Run: From 30° C. to 280° C. (temperature increase rate: 20° C./min)
(b) Tmc: Cooled down to 30° C. at 20° C./min after keeping at 280° C. for 5 min (6) Mesopentad Fraction (mmmm)

A sample is dissolved in solvent to determine a mesopentad fraction (mmmm) with $^{13}$C-NMR under the following condition (Reference: New edition of Polymer Analysis Handbook; edited by Polymer Analysis Research Conference in Japan Society for Analytical Chemistry; 1995 p. 609-611).

A. Measurement Condition
Device: DRX-500 made by Bruker Company
Measurement nucleus: $^{13}$C nucleus (resonance frequency: 125.8 MHz)
Measurement concentration: 10 wt %
Solvent: mixed solvent of benzene/heavy o-dichlorobenzene having mass ratio of ⅓
Measurement temperature: 130° C.
Spin frequency: 12 Hz
NMR sample tube: 5 mm tube
Pulse width: 45° (4.5 μs)
Repetition pulse: 10 sec
Data points: 64K
Conversions: 10,000 times
Measurement mode: complete decoupling B. Analysis Condition The Fourier transformation is performed at LB (Line Broadening factor) of 1.0 to determine the mmmm peak as 21.86 ppm. The peak is split with the WINFIT software (made by Bruker Company). The peak splitting is started from the higher magnetic field as follows, and is optimized by an automatic fitting with a bundled software to sum up the peak fractions of mmmm and ss (Spinning Side band peak of mmmm) to obtain a mesopentad fraction (mmmm).

5 sets of the measurement are performed to calculate an average to be a mesomentad fraction.

Peak
(a) mrrm
(b) (c) rrrm (split into two peaks)
(d) rrrr
(e) mrmm+rmrr
(f) mmrr
(g) mmmr
(h) ss (Spinning Side band peak of mmmm)
(i) mmmm
(j) rmmr (7) the Number of Internally Trisubstituted Olefin Per 10,000 Carbon Atoms A sample is dissolved in solvent to determine with $^1$H-NMR the number of internally trisubstituted olefin under the following condition.

A. Measurement Condition
Device: Nuclear Magnetic Resonance Spectrometer ECX400P made by JEOL Ltd.
Measurement nucleus: $^1$H nucleus (resonance frequency: 500 MHz)
Measurement concentration: 2%
Solvent: heavy o-dichlorobenzene
Measurement temperature: 120° C.
Pulse width: 45°
Repetition pulse: 7 sec
Conversions: 512 times
Measurement mode: nondecoupling B. Analysis Condition
On the basis of chemical shift 7.10 ppm of o-dichlorobenzene, signals in 5.0-5.2 ppm region are attributed to the proton of internally trisubstituted olefin so that a proton ratio of the internally trisubstituted olefin is obtained from the integral calculus ratio to broad signals in 0.5-2.0 ppm region.

(8) Cold Xylene Soluble Part (CXS)
A polypropylene film sample of 0.5 g is dissolved in boiling xylene of 100 ml and is left to be cooled, and then is recrystallized for 1 hour in a constant-temperature water bath at 20° C. Polypropylene-based components (X [g]) dissolved in the filtrate are determined by a liquid chromatography. A CXS is calculated by the following formula, where X0 [g] is an accurate weight of the sample of 0.5 g.

$$CXS\ [mass\ \%]=(X/X0)\times 100$$

(9) Centerline Average Roughness (SRa), Ten-Point Average Roughness (SRz), Pa, Pb These parameters are determined according to JIS B-0601 (1982) with "Noncontact 3D Microfigure Measuring Instrument (ET-30HK)" and "3D Roughness Analyzer (MODEL SPA-11)" made by Kosaka Laboratory Ltd. 10 sets of the measurement are performed along the longitudinal direction to calculate average values as a centerline average roughness (SRa), a ten-point average roughness (SRz) and a total number of protrusions.

Detailed conditions and data processing of a single measurement are as follows.

The numbers of protrusions detected with the device are output by each region of every 50 nm interval (50 nm, 100 nm, 150 nm . . . ).

(a) Total Number of Protrusions Pa, Pb [Units/0.1 mm$^2$]

The total number of protrusions are shown by the total of values converted into a unit per 0.1 mm$^2$ from the number of protrusions detected within a sampling interval along the transverse direction and longitudinal direction, as described in the measurement condition.

Namely, it is the total of detection number which is output from the device in each region along the height direction.

Measurement Condition
Measuring surface processing: Vaporized aluminium is deposited onto the measuring surface in vacuum to perform a noncontact measurement.
Measuring direction: Film width direction
Transverse feeding speed: 0.1 mm/s
Measuring area (width×length): 1.0 mm×0.249 mm
Base level: LOWER
Transverse sampling interval: 2 μm
Longitudinal sampling interval: 10 μm
Longitudinal sampling pieces: 25 pieces
Cutoff: 0.25 mm/s
Transverse magnification: 200 times
Longitudinal magnification: 20,000 times
Cutting undulation/roughness: none Measurement Method
A dedicated sample holder is used for measurement of the film. The sample holder consists of two detachable metal plates having a circular hole in the center. A sample is sandwiched between the plates and the film is fixed as extending to the four corners, and a roughness is measured at the film part corresponding to the circular hole in the center of the plates.

Measurement Result: Data Processing
Table 1 shows an example of the measurement result obtained by the above-described method.

TABLE 1

|  | A-side | B-side |
|---|---|---|
| SRa [nm] | 31.8 | 18.4 |
| SRz [nm] | 863 | 415 |
| SRmax [nm] | 950 | 513 |
| M-AREA [mm$^2$] | 0.249 | 0.249 |
| S-AREA [mm$^2$] | 0.1 | 0.1 |

| Z[nm] | COUNT | COUNT |
|---|---|---|
| 50 | 0.0000 | 0.0000 |
| 100 | 0.0000 | 0.0000 |
| 150 | 0.0000 | 97.9918 |
| 200 | 1.6064 | 8.0321 |
| 250 | 57.4296 | 2.4096 |
| 300 | 91.1645 | 2.4096 |
| 350 | 69.4778 | 2.4096 |
| 400 | 53.0119 | 1.2048 |
| 450 | 40.9638 | 0.8032 |
| 500 | 32.5300 | 0.4016 |
| 550 | 25.7027 | 0.0000 |
| 600 | 18.4738 | 0.0000 |
| 650 | 13.6546 | 0.0000 |
| 700 | 8.0321 | 0.0000 |
| 750 | 5.6225 | 0.0000 |
| 800 | 3.2128 | 0.0000 |
| 850 | 2.4096 | 0.0000 |
| 900 | 0.8032 | 0.0000 |
| 950 | 0.4016 | 0.0000 |
| 1000 | 0.0000 | 0.0000 |
| Total | 424.4970 | 115.6624 |

| | |
|---|---|
| SRaA [nm] | 31.8 |
| SRaB [nm] | 18.4 |
| SRzA [nm] | 863 |
| SRzB [nm] | 415 |
| Pa [units/0.1 mm$^2$] | 424 |
| Pb [units/0.1 mm$^2$] | 116 |
| \|Pa − Pb\| [units/0.1 mm$^2$] | 308 |
| Pa/SRzA | 0.492 |
| Pb/SRzB | 0.280 |

Each parameter can be found in Table 1 as follows.
(A-Side)
SRaA 31.8 nm
SRzA 863 nm
Pa 424 units/0.1 mm$^2$ (rounded off to the whole number)
(B-Side)
SRaB 18.4 nm
SRzB 415 nm
Pb 116 units/0.1 mm$^2$ (rounded off to the whole number)
|Pa−Pb| 308 units/0.1 mm$^2$

(10) Metal Film Resistance
A metallized film is cut into rectangular shapes having 10 mm length along a whole width (50 mm) to prepare samples. The resistance of the metal film of 30 mm width is measured by the four-terminal method. Thus measured resistance is multiplied by the measuring width (10 mm) and then is divided by the electrode interval (30 mm) to obtain a film resistance (surface electric resistance) [Ω/□].

17

(11) Film Breakdown Voltage [V/µm]

According to JIS C2330 (2001) 7.4.11.2B-method (plate electrodes method), some sets of measurement are performed and the measured values are averaged to be divided by a film thickness [µm] (determined by the micrometer method) to obtain the parameter [V/µm].

(12) Element Processability for Capacitor Production (Element Winding Yield)

Vaporized aluminium is deposited in vacuum onto one side of the biaxially stretched polypropylene film prepared in Examples and Comparative Examples described later with a vacuum vapor-deposition device made by ULVAC Company so that the film resistance is 8 Ω/sq. The deposition pattern is formed like a stripe having margin parts along the longitudinal direction (repeated deposition part width of 39.0 mm and margin part width of 1.0 mm). Next, each deposition part and each margin part are slit with blades in the middle to prepare a tape of 20 mm total width having a margin part of 0.5 mm width on the left or right edge to be rewound by a reel. Each reel having the left margin or the right margin is overlapped to make the deposition part protrude widthwise from the margin part and is wound to make a winding body having capacitance of approximately 10 µF. The tape is rewound with KAW-4NHB made by Kaido MFG. CO., LTD. to make an element.

The visual observation is performed to inspect the capacitors being produced from the beginning to the end of winding. The one having wrinkles or slips is disqualified and the rest of qualified products per all the products is calculated in percentage to obtain an index of processability (may be called element winding yield). The element winding yield is preferably as high as possible. The yield of 95% or more is evaluated as "Good", while the yield of 80% to less than 95% is "Acceptable" and the yield of less than 80% is "No good". "Good" and "Acceptable" are practical levels.

(13) Evaluation of Vapor Deposition Capacitor Characteristics

Vaporized aluminium is deposited in a vacuum onto the biaxially stretched polypropylene film prepared in Examples and Comparative Examples described later with a vacuum vapor-deposition device made by ULVAC Company so that the film has a resistance of 8 Ω/sq and width of 50 mm and is wound into a deposition reel. The deposition pattern is formed as having a so-called T-shape margin pattern having a margin part which is orthogonal to the longitudinal direction.

Next, the tape reel is rewound with KAW-4NHB made by Kaido MFG. CO., LTD to make a capacitor element. Then, a molten metal is sprayed to the capacitor element, which is heated in vacuum at 105° C. for 10 hours and is provided with lead wires to make up a capacitor element. The capacitor has capacitance of 5 µF.

Voltage of 500 VDC is applied at normal temperature to thus obtained capacitor elements of ten pieces for 10 minutes and then the voltage is increased stepwise at an increase rate of 50 VDC/1 min repeatedly as a so-called "step-up" test. The capacitance is measured to be plotted on a graph, in which the voltage corresponding to the capacitance of 70% relative to the initial capacitance is read off and is divided by the film thickness determined by the micrometer method to obtain an evaluation index of withstanding voltage. The evaluation index of 300V/µm or more is practical level. For use of possible high-voltage capacitors, it is preferable that the evaluation index of withstanding voltage is 470V/µm or more. Further, after increasing the applied voltage to decrease the capacitance to 10% relative to the initial value, the capacitor element is dismantled to examine a destruction condition, so that a security is evaluated as follows.

Good: Neither element deformation nor destructive penetration is observed.

Acceptable: No element deformation is found but at most 10 film layers of destructive penetration are observed.

No good: Element deformation and 10 or more film layers of destructive penetration are observed.

Bad: Element is destructed.

"Good" has no problem while "Acceptable" may be allowed depending on the condition. "No good" and "Bad" might have a practical problem.

EXAMPLES

Hereinafter, our films, metallized films and capacitors will be explained in detail. Characteristics are measured by the above-described methods.

Example 1

Linear-chain polypropylene resin "Borclean (registered trademark)" made by Borealis Company having mesopentad fraction of 0.985 and melt flow rate (MFR) of 2.6 g/10 min was blended with 0.5 mass % of branched-chain polypropylene resin "Daploy HMS-PP" made by Borealis Company having the number of internally trisubstituted olefin of 3 per 10,000 carbon atoms, and was fed to an extruder at 250° C. to be melt extruded at resin temperature of 250° C. through a T-shaped slit die into a sheet, and then the melted sheet was solidified to prepare an unstretched sheet by cooling on a cooling drum which has diameter of 1 m and was maintained at 90° C. The film was retained on the chill roll for 2.5 sec. Next, both the roll contacting the A-side of the unstretched film and the roll contacting the B-side of the unstretched film were preheated to 140° C. Further, pressurized steam was flowed inside the nip roll contacting the A-side of the film to heat the surface of the nip roll to 130° C. The nip pressure was 0.50 MPa. Successively the film was run between rolls which had a differential speed and was maintained at 145° C. to be stretched by a draw ratio of 4.5 in the longitudinal direction. The film was stretched in a stretching zone as being heated with a radiation heater of output 10.0 kW to make up for heat quantity. Immediately after that, the film was run between rolls maintained at 35° C. and was quenched.

The quenched film was stretched with a tenter at 158° C. by a draw ratio of 10 in the transverse direction to be heat-set at 155° C. while being relaxed by 6% in the transverse direction, and was cooled to prepare a biaxially stretched polypropylene film having a film thickness of 2.5 µm. The film surface was subjected to a corona discharge processing in the atmosphere at processing intensity of 25 W·min/m².

Tables 2, 3 and 4 show characteristics of thus prepared biaxially stretched polypropylene film as well as withstanding voltage (insulation breakdown voltage) and element processability (element winding yield) of capacitor made from the film. As shown in Tables 2, 3 and 4, the capacitor made from the biaxially stretched polypropylene film in Example 1 was excellent in withstanding voltage and security.

TABLE 2

| | Film thickness [μm] | Linear-chain PP MFR [g/10 min] | Linear-chain PP mmmm [—] | Linear-chain PP Ash [ppm] | Linear-chain PP CXS [mass %] | Linear-chain PP1 MeltCrystallization Temperature [° C.] | Branched-chain PP [cN] | Filmgloss A-side [%] | Filmgloss B-side [%] |
|---|---|---|---|---|---|---|---|---|---|
| Example 1 | 2.5 | 2.6 | 0.985 | 23 | 3.2 | 119.1 | 16.5 | 120 | 122 |
| Example 2 | 2.5 | 2.6 | 0.985 | 23 | 3.2 | 119.1 | 16.5 | 125 | 127 |
| Example 3 | 2.5 | 2.6 | 0.985 | 23 | 3.2 | 119.1 | 16.5 | 130 | 130 |
| Example 4 | 2.5 | 2.6 | 0.985 | 23 | 3.2 | 119.1 | 16.5 | 125 | 126 |
| Example 5 | 2.5 | 2.6 | 0.985 | 23 | 3.2 | 119.1 | 16.5 | 120 | 120 |
| Example 6 | 2.5 | 2.6 | 0.985 | 23 | 3.2 | 119.1 | 16.5 | 127 | 127 |
| Example 7 | 2.5 | 2.6 | 0.985 | 23 | 3.2 | 119.1 | 16.5 | 117 | 117 |
| Example 8 | 2.5 | 2.6 | 0.985 | 23 | 3.2 | 119.1 | 16.5 | 118 | 121 |
| Example 9 | 2.5 | 2.6 | 0.985 | 23 | 3.2 | 119.1 | 16.5 | 118 | 118 |
| Example 10 | 2.5 | 2.6 | 0.985 | 23 | 3.2 | 119.1 | 16.5 | 123 | 124 |
| Example 11 | 3.0 | 2.6 | 0.985 | 23 | 3.2 | 119.1 | 16.5 | 120 | 120 |
| Example 12 | 2.8 | 2.6 | 0.985 | 23 | 3.2 | 119.1 | 16.5 | 122 | 122 |
| Example 13 | 2.0 | 2.6 | 0.985 | 23 | 3.2 | 119.1 | 16.5 | 124 | 125 |
| Example 14 | 1.5 | 2.6 | 0.985 | 23 | 3.2 | 119.1 | 16.5 | 130 | 130 |
| Example 15 | 1.2 | 2.6 | 0.985 | 23 | 3.2 | 119.1 | 16.5 | 132 | 132 |
| Comparative Example 1 | 2.5 | 2.6 | 0.985 | 23 | 3.2 | 119.1 | 16.5 | 125 | 125 |
| Comparative Example 2 | 2.5 | 2.6 | 0.985 | 23 | 3.2 | 109.3 | — | 133 | 137 |
| Comparative Example 3 | 2.5 | 2.6 | 0.985 | 23 | 3.2 | 119.1 | 16.5 | 140 | 141 |
| Comparative Example 4 | 2.5 | 2.6 | 0.985 | 23 | 3.2 | 119.1 | 16.5 | 136 | 137 |
| Comparative Example 5 | 2.5 | 2.6 | 0.985 | 23 | 3.2 | 119.1 | 16.5 | 103 | 104 |
| Comparative Example 6 | 2.5 | 2.6 | 0.985 | 23 | 3.2 | 119.1 | 16.5 | 135 | 135 |

TABLE 3

| | Pa [units/0.1 mm$^2$] | Pb [units/0.1 mm$^2$] | \|Pa − Pb\| [units/0.1 mm$^2$] | Pa/SRzA [units/0.1 mm$^2$/nm] | SRaA [nm] | SRaB [nm] | SRzA [nm] | SRzB [nm] |
|---|---|---|---|---|---|---|---|---|
| Example 1 | 472 | 101 | 371 | 0.57 | 30 | 19 | 835 | 420 |
| Example 2 | 598 | 84 | 514 | 0.68 | 35 | 20 | 878 | 338 |
| Example 3 | 324 | 94 | 230 | 0.47 | 28 | 21 | 695 | 360 |
| Example 4 | 430 | 80 | 350 | 0.55 | 28 | 14 | 780 | 335 |
| Example 5 | 544 | 123 | 421 | 0.48 | 34 | 24 | 1144 | 450 |
| Example 6 | 353 | 77 | 276 | 0.49 | 25 | 12 | 725 | 140 |
| Example 7 | 521 | 120 | 401 | 0.47 | 32 | 23 | 1100 | 478 |
| Example 8 | 497 | 113 | 384 | 0.57 | 33 | 19 | 870 | 414 |
| Example 9 | 514 | 118 | 396 | 0.58 | 34 | 22 | 884 | 460 |
| Example 10 | 432 | 86 | 346 | 0.53 | 28 | 17 | 810 | 355 |
| Example 11 | 460 | 95 | 365 | 0.54 | 34 | 20 | 850 | 412 |
| Example 12 | 466 | 100 | 366 | 0.55 | 33 | 20 | 845 | 400 |
| Example 13 | 453 | 87 | 366 | 0.56 | 30 | 19 | 809 | 335 |
| Example 14 | 421 | 92 | 329 | 0.56 | 30 | 20 | 755 | 312 |
| Example 15 | 408 | 94 | 314 | 0.56 | 29 | 20 | 730 | 303 |
| Comparative Example 1 | 548 | 325 | 223 | 0.49 | 42 | 30 | 1120 | 933 |
| Comparative Example 2 | 423 | 25 | 398 | 0.32 | 29 | 16 | 1320 | 377 |
| Comparative Example 3 | 123 | 113 | 10 | 0.25 | 19 | 18 | 489 | 430 |
| Comparative Example 4 | 482 | 386 | 96 | 0.58 | 35 | 28 | 828 | 658 |
| Comparative Example 5 | 674 | 388 | 286 | 0.55 | 40 | 35 | 1220 | 600 |
| Comparative Example 6 | 241 | 66 | 175 | 0.38 | 28 | 13 | 630 | 165 |

TABLE 4

| | Film insulation breakdown voltage [V/μm] | Element winding yield | Capacitor characteristics Withstanding voltage [V/μm] | Security |
|---|---|---|---|---|
| Example 1 | 614 | ◯: Good | 515 | ◉: Good |
| Example 2 | 640 | ◯: Good | 538 | ◉: Good |

TABLE 4-continued

| | Film insulation | | Capacitor characteristics | |
| --- | --- | --- | --- | --- |
| | breakdown voltage [V/μm] | Element winding yield | Withstanding voltage [V/μm] | Security |
| Example 3 | 602 | ○: Good | 503 | ○: Acceptable |
| Example 4 | 623 | ○: Good | 520 | ○: Acceptable |
| Example 5 | 600 | ○: Good | 485 | ◎: Good |
| Example 6 | 655 | ○: Good | 521 | ○: Acceptable |
| Example 7 | 583 | ○: Good | 490 | ◎: Good |
| Example 8 | 604 | ○: Good | 500 | ◎: Good |
| Example 9 | 596 | ○: Good | 492 | ◎: Good |
| Example 10 | 629 | ○: Good | 522 | ○: Acceptable |
| Example 11 | 609 | ○: Good | 501 | ◎: Good |
| Example 12 | 613 | ○: Good | 505 | ◎: Good |
| Example 13 | 602 | ○: Good | 490 | ○: Acceptable |
| Example 14 | 595 | ○: Good | 477 | ○: Acceptable |
| Example 15 | 588 | ○: Good | 475 | ○: Acceptable |
| Comparative Example 1 | 640 | ○: Good | 450 | ◎: Good |
| Comparative Example 2 | 480 | Δ: Acceptable | 320 | Δ: No good |
| Comparative Example 3 | 618 | X: No good | 342 | X: Bad |
| Comparative Example 4 | 520 | ○: Good | 416 | ◎: Good |
| Comparative Example 5 | 560 | Δ: Acceptable | 440 | ◎: Good |
| Comparative Example 6 | 630 | X: No good | 405 | X: Bad |

Example 2

A film having a thickness of 2.5 μm was formed by the same method as Example 1, except that the unstretched film was preheated with the roll contacting the B-side of the film at 120° C. and the roll contacting the A-side of the film at 140° C. Characteristics of thus prepared film are shown in Tables 2, 3 and 4.

Example 3

A film having a thickness of 2.5 μm was formed by the same method as Example 1, except that the radiation heater was operated with output 7.0 kW. Characteristics of thus prepared film are shown in Tables 2, 3 and 4.

Example 4

A film having a thickness of 2.5 μm was formed by the same method as Example 1, except that the melted sheet which had been melt extruded at resin temperature of 250° C. was solidified to form a film by cooling on the cooling drum of 1 m diameter maintained at 85° C. Characteristics of thus prepared film are shown in Tables 2, 3 and 4.

Example 5

A film having a thickness of 2.5 μm was formed by the same method as Example 1, except that the melted sheet which had been melt extruded at resin temperature of 250° C. was solidified to form a film by cooling on the cooling drum of 1 m diameter maintained at 100° C. and that the unstretched film was preheated with the roll contacting the B-side of the film at 125° C. and the roll contacting the A-side of the film at 135° C. Characteristics of thus prepared film are shown in Tables 2, 3 and 4.

Example 6

A film having a thickness of 2.5 μm was formed by the same method as Example 1, except that the unstretched film was preheated with the roll contacting the B-side of the film at 120° C. and the roll contacting the A-side of the film at 130° C. Characteristics of thus prepared film are shown in Tables 2, 3 and 4.

Example 7

A film having a thickness of 2.5 μm was formed by the same method as Example 1, except that the radiation heater was operated with output 13.0 kW. Characteristics of thus prepared film are shown in Tables 2, 3 and 4.

Example 8

A film having a thickness of 2.5 μm was formed by the same method as Example 1, except that the surface of the nip roll contacting the A-side of the film was maintained at 140° C. Characteristics of thus prepared film are shown in Tables 2, 3 and 4.

Example 9

A film having a thickness of 2.5 μm was formed by the same method as Example 1, except that the unstretched film was run between rolls which had a differential speed and were maintained at 150° C. Characteristics of thus prepared film are shown in Tables 2, 3 and 4.

Example 10

A film having a thickness of 2.5 μm was formed by the same method as Example 1, except that the unstretched film was run between rolls which had a differential speed and were maintained at 140° C. Characteristics of thus prepared film are shown in Tables 2, 3 and 4.

Example 11

A film having a thickness of 3.0 μm was formed by the same method as Example 1, except that the melted sheet which had been melt extruded at resin temperature 250° C. was solidified to form a film by cooling on the cooling drum of 1 m diameter maintained at 88° C., the radiation heater was operated with output 10.5 kW and the quenched film was stretched in the transverse direction at 160° C. Characteristics of thus prepared film are shown in Tables 2, 3 and 4.

Example 12

A film having a thickness of 2.8 μm was formed by the same method as Example 1, except that the melted sheet which had been melt extruded at resin temperature of 250° C. was solidified to form a film by cooling on the cooling drum of 1 m diameter maintained at 89° C., the radiation heater was operated with output 10.5 kW and the quenched film was stretched in the transverse direction at 159° C. Characteristics of thus prepared film are shown in Tables 2, 3 and 4.

Example 13

A film having a thickness of 2.0 μm was formed by the same method as Example 1, except that the melted sheet which had been melt extruded at resin temperature of 250° C. was solidified to form a film by cooling on the cooling drum of 1 m diameter maintained at 92° C. and the radiation heater was operated with output 9.5 kW. Characteristics of thus prepared film are shown in Tables 2, 3 and 4.

Example 14

A film having a thickness of 1.5 μm was formed by the same method as Example 1, except that the melted sheet which had been melt extruded at resin temperature of 250° C. was solidified to form a film by cooling on the cooling drum of 1 m diameter maintained at 93° C., the radiation heater was operated with output 9.0 kW and the quenched film was stretched in the transverse direction at 157° C. Characteristics of thus prepared film are shown in Tables 2, 3 and 4.

Example 15

A film having a thickness of 1.2 μm was formed by the same method as Example 1, except that the melted sheet which had been melt extruded at resin temperature of 250° C. was solidified to form a film by cooling on the cooling drum of 1 m diameter maintained at 94° C., the radiation heater was operated with output 8.0 kW and the quenched film was stretched in the transverse direction at 157° C. Characteristics of thus prepared film are shown in Tables 2, 3 and 4.

Comparative Example 1

A film having a thickness of 2.5 μm was formed by the same method as Example 1, except that the surface temperature of the nip roll was not controlled. Characteristics of thus prepared film are shown in Tables 2, 3 and 4.

Comparative Example 2

A film having a thickness of 2.5 μm was formed by the same method as Example 1, except that the branched-chain polypropylene resin was not blended. Characteristics of thus prepared film are shown in Tables 2, 3 and 4.

Comparative Example 3

In the same way as Example 1, the blended resin was melt extruded and solidified to prepare an unstretched film by cooling on the cooling drum of 1 m diameter, except that the cooling drum was maintained at 60° C. The film was retained on the chill roll for 2.0 sec. Next, the unstretched film was run between rolls which had a differential speed and were maintained at 130° C. to be stretched by a draw ratio of 4.6 in the longitudinal direction. The surface temperature of the nip roll contacting the A-side of the film was not controlled while the nip pressure was controlled at 0.50 MPa. The film was stretched in a stretching zone as being heated with a radiation heater of output 3.5 kW to make up for heat quantity. The same processes as Example 1 after the longitudinal stretching were performed to prepare a film having a thickness of 2.5 μm.

Comparative Example 4

In the same way as Example 1, the blended resin was melt extruded and solidified to prepare an unstretched film by cooling on the cooling drum which has diameter of 1 m, except that the cooling drum was maintained at 70° C. The film was retained on the chill roll for 3.0 sec. Next, the unstretched film was preheated with the roll contacting the A-side of the film at 140° C. and the roll contacting the B-side of the film at 130° C. Successively, the film was run between rolls which had a differential speed and were maintained at 148° C. to be stretched by a draw ratio of 4.6 in the longitudinal direction. The surface temperature of the nip roll contacting the A-side of the film was not controlled while the nip pressure was controlled at 0.50 MPa. The film was stretched in a stretching zone as being heated with a radiation heater of output 10.5 kW to make up for heat quantity. The same processes as Example 1 after the longitudinal stretching were performed to prepare a film having a thickness of 2.5 μm.

Comparative Example 5

A film having a thickness of 2.5 μm was formed by the same method as Example 1, except that both the roll contacting the A-side of the unstretched film and the roll contacting the B-side of the unstretched film were preheated to 150° C. Characteristics of thus prepared film are shown in Tables 2, 3 and 4.

Comparative Example 6

A film having a thickness of 2.5 μm was formed by the same method as Example 1, except that the radiation heater was not operated. Characteristics of thus prepared film are shown in Tables 2, 3 and 4.

INDUSTRIAL APPLICATIONS

A biaxially stretched polypropylene and a metallized film is applicable for producing capacitors and is suitable for producing film capacitors as automotive component parts.

The invention claimed is:
1. A biaxially stretched polypropylene film for capacitors which has protrusions on both sides and has a thickness t1 of 1 μm to 3 μm, wherein Formulae (1) to (5) are satisfied by an A-side corresponding to one surface of the film and a B-side corresponding to another surface of the film:

$$|Pa-Pb| \geq 276; \quad (1)$$

$$0.350 \leq Pa/SRzA \leq 0.700; \quad (2)$$

$$500 \text{ nm} \leq SRzA \leq 1{,}200 \text{ nm}; \quad (3)$$

$$50 \text{ nm} \leq SRzB \leq 500 \text{ nm}; \quad (4)$$

$$456 \text{ nm} \leq (SRzA - SRzB) \leq 694 \text{ nm}; \quad (5)$$

wherein, in Formulae (1) to (5), Pa is a number per $0.1\text{mm}^2$ of protrusions on the A-side, Pb is a number per $0.1\text{mm}^2$ of protrusions on the B-side, SRzA is a ten-point average roughness of the A-side, and SRzB is a ten-point average roughness of the B-side.

2. The biaxially stretched polypropylene film according to claim 1, wherein a centerline average roughness SRaA of the A-side is 25nm to 45nm.

3. The biaxially stretched polypropylene film according to claim 2, wherein a centerline average roughness SRaB of the B-side is 10nm to 25nm.

4. A metallized film comprising a metal film arranged on at least one side of the biaxially stretched polypropylene film according to claim 2.

5. The biaxially stretched polypropylene film according to claim 1, wherein a centerline average roughness SRaB of the B-side is 10nm to 25nm.

6. A metallized film comprising a metal film arranged on at least one side of the biaxially stretched polypropylene film according to claim 5.

7. A metallized film comprising a metal film arranged on at least one side of the biaxially stretched polypropylene film according to claim 1.

8. The metallized film according to claim 7, wherein the metal film has a surface electric resistance of 1 to 20 $\Omega/\square$.

9. A film capacitor comprising the metallized film according to claim 8.

10. A film capacitor comprising the metallized film according to claim 7.

* * * * *